(12) United States Patent
Alderliesten et al.

(10) Patent No.: US 9,636,891 B2
(45) Date of Patent: May 2, 2017

(54) AIRCRAFT WING AND FIBER METAL LAMINATE FORMING PART OF SUCH AN AIRCRAFT WING

(75) Inventors: Christiaan Reyndert Alderliesten, Delft (NL); Rinze Benedictus, Delft (NL)

(73) Assignee: CONSTELLIUM ISSOIRE, Issoire (FR)

( * ) Notice: Subject to any disclaimer, the term of this patent is extended or adjusted under 35 U.S.C. 154(b) by 116 days.

(21) Appl. No.: 13/823,561

(22) PCT Filed: Oct. 14, 2011

(86) PCT No.: PCT/NL2011/050705
§ 371 (c)(1),
(2), (4) Date: May 28, 2013

(87) PCT Pub. No.: WO2012/050450
PCT Pub. Date: Apr. 19, 2012

(65) Prior Publication Data
US 2013/0233972 A1    Sep. 12, 2013

(30) Foreign Application Priority Data
Oct. 15, 2010  (NL) ..................................... 2005536

(51) Int. Cl.
*B32B 5/12* (2006.01)
*B32B 5/26* (2006.01)
(Continued)

(52) U.S. Cl.
CPC .................. *B32B 5/12* (2013.01); *B32B 5/26* (2013.01); *B32B 5/28* (2013.01); *B32B 15/08* (2013.01);
(Continued)

(58) Field of Classification Search
CPC .. B32B 5/12; B32B 15/08; B32B 5/28; B32B 15/14; B32B 5/26; B32B 2262/101;
(Continued)

(56) References Cited

U.S. PATENT DOCUMENTS 3,565,740 A * 2/1971 Winters .......................... 428/76
5,227,216 A   7/1993 Pettit
(Continued)

FOREIGN PATENT DOCUMENTS

EP   1614531   1/2006
GB   2151185   7/1985
(Continued)

OTHER PUBLICATIONS

International Search Report for PCTNL2001/050705 Mailed Nov. 30, 2011.

*Primary Examiner* — Valentina Xaiver
(74) *Attorney, Agent, or Firm* — McBee Moore Woodward & Vanik IP LLC

(57) ABSTRACT

Fiber metal laminate (4) and an aircraft wing (1) having a longitudinal direction, comprising metal layers (5) and fiber reinforced plastic layers (6, 7, 6', 7'; 6", 7") in between said metal layers (5), wherein the metal layers (5) and the fiber reinforced plastic layers (6, 7, 6', 7'; 6", 7") are bonded together, and wherein the fibers of at least some of the fiber reinforced plastic layers (6, 7, 6', 7'; 6", 7") are arranged in a first group in a first plastic layer (6) and in a second group in a second plastic layer (7) whereby the fibers of the first group are at an angle with respect to the fibers of the second group, wherein said laminate (4) exhibits fibers of a first type and fibers of a second type, wherein the fibers of the first type being arranged in the said longitudinal direction of the laminate (4) in one or more of its fiber reinforced plastic layers (6', 7'; 6", 7"), and that it has adjacent fiber reinforced plastic layers (6, 7) at or near a symmetry-plane of the
(Continued)

laminate (4) that are provided with the fibers of the second type.

14 Claims, 2 Drawing Sheets

(51) Int. Cl.
    *B32B 5/28*     (2006.01)
    *B32B 15/08*     (2006.01)
    *B32B 15/14*     (2006.01)
    *B64C 3/26*     (2006.01)

(52) U.S. Cl.
    CPC ............... *B32B 15/14* (2013.01); *B64C 3/26* (2013.01); *B32B 2250/40* (2013.01); *B32B 2250/42* (2013.01); *B32B 2260/023* (2013.01); *B32B 2260/048* (2013.01); *B32B 2262/0269* (2013.01); *B32B 2262/101* (2013.01); *B32B 2262/106* (2013.01); *B32B 2605/18* (2013.01); *Y02T 50/433* (2013.01); *Y10T 428/24124* (2015.01)

(58) Field of Classification Search
    CPC .......... B32B 2260/023; B32B 2250/42; B32B 2260/048; B32B 2262/106; B32B 2605/18; B32B 2250/40; B32B 2262/0269; B64C 3/26; Y10T 428/24124; Y02T 50/433
    USPC ....... 244/123.1; 428/76, 110, 113, 215, 220, 428/650
    See application file for complete search history.

(56) References Cited

U.S. PATENT DOCUMENTS

| | | | |
|---|---|---|---|
| 5,547,735 A | * | 8/1996 | Roebroeks et al. .......... 428/110 |
| 2005/0037188 A1 | | 2/2005 | Ehrstrom et al. |

FOREIGN PATENT DOCUMENTS

| | | |
|---|---|---|
| NL | 2005536 | 4/2012 |
| WO | 2004/071761 | 8/2004 |
| WO | 2006/037083 | 4/2006 |
| WO | 2007/145512 | 12/2007 |
| WO | 2009/014486 | 1/2009 |

\* cited by examiner

AIRCRAFT WING AND FIBER METAL LAMINATE FORMING PART OF SUCH AN AIRCRAFT WING

CROSS REFERENCE TO RELATED APPLICATIONS

This application is a §371 National Stage Application of PCT/NL2011/050705, filed Oct. 14, 2011, which claims priority to Netherlands Application No. 2005536, filed Oct. 15, 2010.

BACKGROUND OF THE INVENTION

Field of the Invention

The invention relates to a fiber metal laminate comprising metal layers and fiber reinforced plastic layers in between said metal layers, wherein the metal layers and the fiber reinforced plastic layers are bonded together, and wherein the fibers of the fiber reinforced plastic layers are arranged in a first group and in a second group whereby the fibers of the first group are at an angle with respect to the fibers of the second group.

Description of Related Art

The invention relates further to an aircraft wing embodied with one or more of such fiber metal laminates.

A fiber metal laminate according to the preamble is known from U.S. Pat. No. 5,547,735. This known fiber metal laminate comprises a bidirectional reinforcing layer containing about 45-70 volume percent high-strength glass fibers. The bidirectional reinforcing layer includes a center layer containing glass fibers oriented generally parallel to a first direction; and first and second outer layers each reinforced with glass fibers oriented in a second direction extending generally transverse to the first direction. The bidirectional laminate is suitable for use in aircraft flooring and other applications requiring improved impact strength.

WO2004/071761 discloses a laminate of at least two plates formed from an aluminium alloy, which each have a thickness of less than 1 mm and between which is situated an intermediate layer on the basis of plastic which is connected to the metal plates and contains at least two groups of preferably continuous, mutually parallel fibers whereby the fibers of the two different groups intersect preferably at an angle of about 90 degrees. The fibers may be made of aromatic polyamide, glass or carbon. The laminate according to this citation may be applied as skin plate for the body of an aircraft or spacecraft.

The prior art is silent on the use and the associated problems when a fiber metal laminate is to be used as a skin panel for an aircraft wing.

Aircraft wing structures which are known to comprise upper wing skin panels and lower wing skin panels are predominantly loaded by upward fatigue bending and torsional loading. For the lower wing skin panels of the aircraft wing this implies uni-axial tensile loads and shear loads.

To meet the uni-axial tensile loads and to provide sufficient bending stiffness and strength to the laminate and to the aircraft wing in which the laminate is applied, it is known to use a fiber metal laminate having the fibers oriented in the wingspan direction. The problem is however that then the shear stiffness and shear strength is low.

It has also been proposed to orient the fibers in the fiber metal laminate at an angle of for instance 45 degrees, yet this goes at the expense of a reduced bending stiffness and strength.

As a further alternative it has been proposed to diminish the volume of the fiber reinforced plastic layers in favor of the volume of the metal layers, which are usually made out of aluminium. The aluminium layers exhibit a higher shear stiffness, but this solution reduces the fatigue performance of the laminate in comparison with a regular fiber metal laminate significantly.

SUMMARY

The invention aims therefore to provide a fiber metal laminate and an aircraft wing embodied with such a fiber metal laminate, wherein the shear stiffness is improved whilst the tensile stiffness is predominantly maintained at a value that corresponds to what is known from the prior art.

To this end according to the invention a laminate and an aircraft wing is proposed in accordance with one or more of the appended claims.

Essentially a fiber metal laminate and an aircraft wing having upper wing skin panels and lower wing skin panels comprising such a fiber metal laminate is proposed, wherein the fiber metal laminate has metal layers and fiber reinforced plastic layers in between said metal layers, wherein the metal layers and the fiber reinforced plastic layers are bonded together, wherein said laminate exhibits fibers of a first type and fibers of a second type, wherein the fibers of the first type are provided in the laminate's (and the wing's) longitudinal direction in one or more of its fiber reinforced plastic layers, and wherein the fibers of the second type are provided in fiber reinforced plastic layers at or near a symmetry plane of the laminate. In comparison with a conventional fiber metal laminate the tensile stiffness of the fiber metal laminate of the invention can thus be generally maintained at the same level or better, whilst the shear stiffness can be improved.

DETAILED DESCRIPTION OF A PREFERRED EMBODIMENT

Figure 1:
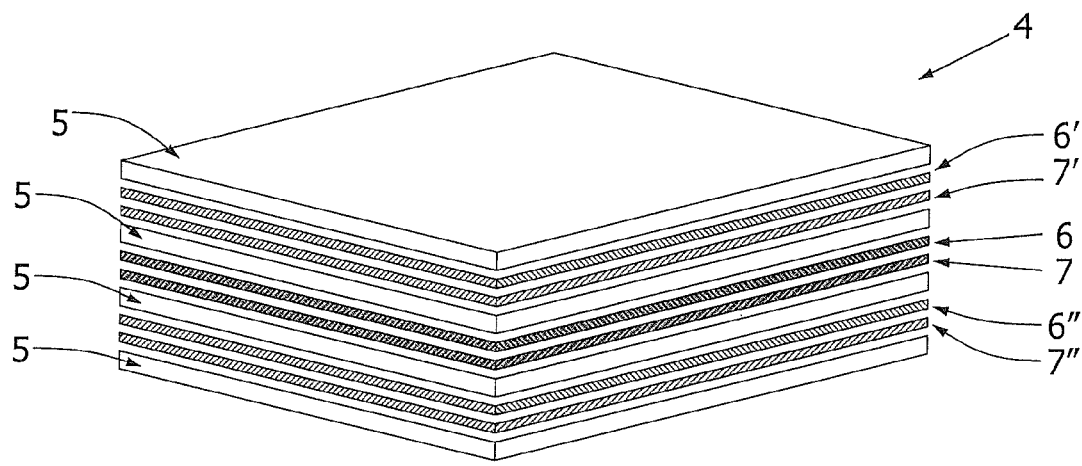
FIGS. 1-3 represent embodiments as described herein.

Best results are achieved when the fibers of the second type are arranged in a first group of fibers in a first layer of the adjacent fiber reinforced plastic layers at or near a symmetry plane of the laminate, and in a second group of fibers in a second layer of the adjacent fiber reinforced plastic layers at or near a symmetry plane of the laminate, whereby the fibers of the first group and the fibers of the second group are oriented at a predefined angle with respect to the longitudinal direction of the laminate which is selected in the range plus or minus 10-40 degrees.

It is further preferable that the fibers of the second type have higher strength and stiffness than the fibers of the first type.

The specifications of the laminate of the invention can be suitably tuned by selecting the angle between the fibers of the second type in the first group and the fibers of the second type in the second group at a value depending on the difference in stiffness of the fibers of the first type and the fibers of the second type.

In a preferred embodiment the predefined angle of the fibers of the second type with reference to the said fibers of the first type in the longitudinal direction is selected at a value of plus or minus 10 degrees. This not only improves the shear stiffness of the laminate and torsional stiffness of the wing, but also raises the tensile stiffness of the laminate and bending stiffness of the wing significantly.

In another preferred embodiment the predefined angle of the fibers of the second type with reference to the fibers of the first type in the longitudinal direction is selected at a value of plus or minus 40 degrees. This gives the largest improvement in shear stiffness of the laminate and torsional stiffness of the wing, whilst the tensile stiffness of the laminate and bending stiffness of the wing can be maintained at approximately the value of the prior art fiber metal laminate.

It is preferable that the metal layers are aluminium layers, that the fibers of the first type in the fiber reinforced plastic layers are selected from the group comprising glass fibers, aramid fibers, PBO fibers, and that the fibers of the second type in the fiber reinforced plastic layers are selected from the group comprising aramid fibers, PBO fibers, carbon fibers.

Advantageously, the aluminum layers comprise alloys from the 5xxx series and/or alloys from the 2xxx series, preferably containing at least 0.1 wt. % lithium, the alloys being defined according to the rules of The Aluminium Association known to those skilled in the art.

EXAMPLE

To show the improvement in shear stiffness while maintaining or even increasing the tensile stiffness, a comparison has been made of several fiber metal laminates according to the invention with a conventional fiber metal laminate comprising five aluminium layers with in-between four fiber reinforced plastic layers containing glass fibers in the longitudinal direction, referred to in literature as Glare2-5/4-0.4.

The fiber metal laminates of the invention that have been compared with the conventional fiber metal laminate have fibers of a first type in the longitudinal direction of the laminate, and fibers of a second type that are oriented in a first angle with respect to the longitudinal direction of the laminate, and fibers of a second type that are oriented at a second angle with respect to the longitudinal direction of the laminate. Said angles are selected at plus or minus 10°, 25° and 40° respectively. The table below provides the measured results.

| Panel | Tensile stiffness | Shear stiffness |
|---|---|---|
| Standard Glare panel Glare 2-5/4-0.4 | 100% | 100% |
| Invention panel plus and minus 10° | 129% | 104% |
| Invention panel plus and minus 25° | 115% | 119% |
| Invention panel plus and minus 40° | 98% | 131% |

The invention will hereinafter be further elucidated with reference to the drawing of an aircraft wing and an exemplary embodiment of the laminate of the invention.

Figure 2:
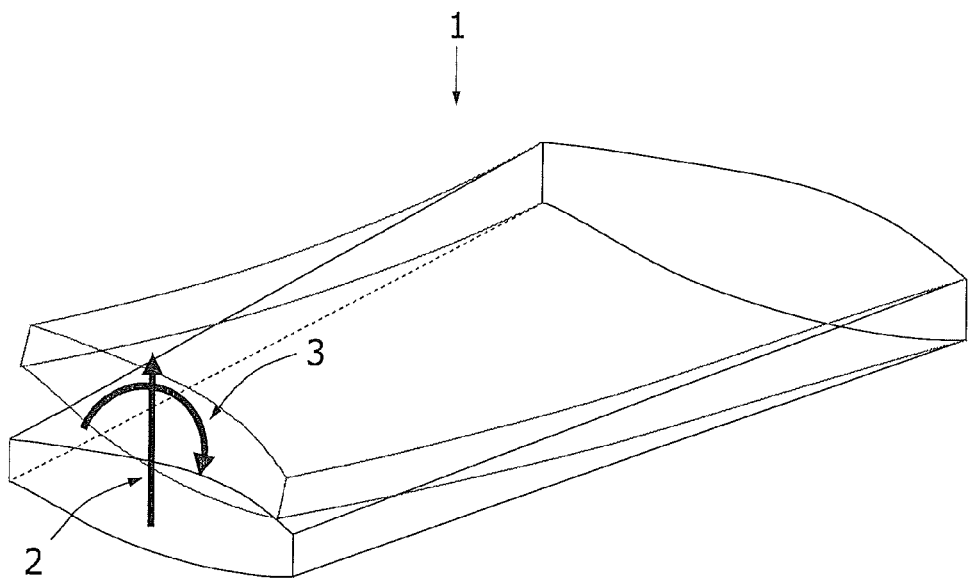
Figure 3:
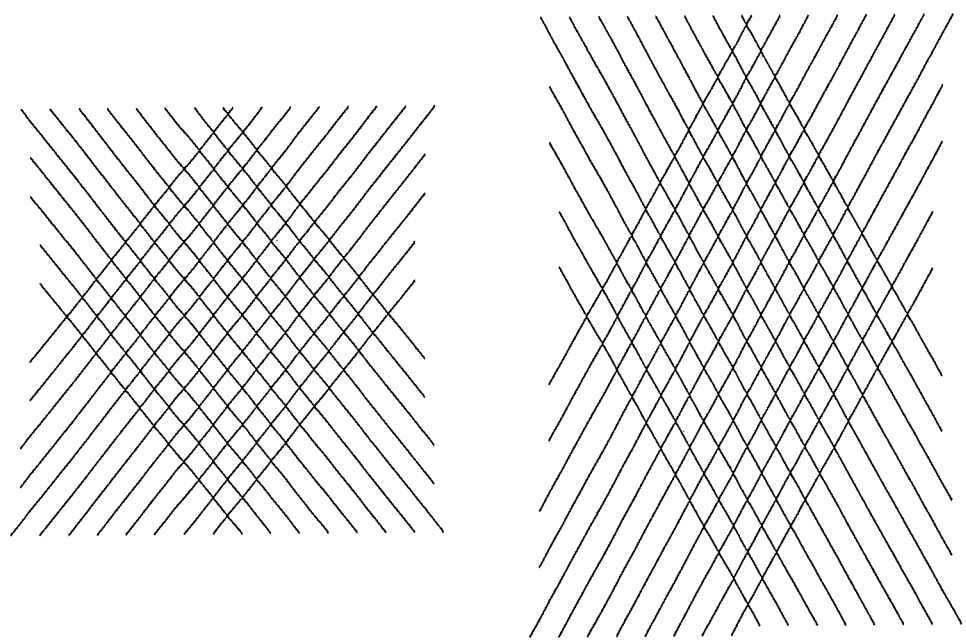

In the drawing:

FIG. 1 shows a fiber metal laminate of the invention;

FIG. 2 shows a part of an aircraft wing;

FIG. 3 shows the orientation of the fibers of the second type that are arranged in a symmetry plane of the fiber metal laminate of the invention.

With reference first to FIG. 2 a part of an aircraft wing 1 is shown which during use is subjected to upward bending forces generated by lift as indicated by the arrow 2. The aircraft wing 1 is also subjected to torsional forces as indicated by the arrow 3.

FIG. 1 shows the laminate 4 of the invention which is embodied with metal layers 5 and fiber reinforced plastic layers 6, 7 in or near the symmetry plane of the laminate 4, between said metal layers 5. Further there are fiber reinforced plastic layers 6', 7' and 6", 7" on opposite sides of the said fiber reinforced plastic layers 6, 7 in the symmetry plane of the laminate between the metal layers 5. The metal layers 5 and the fiber reinforced plastic layers 6, 7; 6', 7'; 6", 7" are all bonded together.

At least one or some of the fiber reinforced plastic layers 6', 7' and 6", 7" that are not in or near the symmetry plane of the laminate 4 exhibit fibers of a first type that are oriented in the longitudinal direction of the laminate 4. This longitudinal direction corresponds to the longitudinal direction of the assembled wing. These fibers of the first type may be selected from the group comprising glass fibers, aramid fibers, PBO fibers.

At least the fibers of the adjacent fiber reinforced plastic layers 6, 7 at or near the symmetry plane of the laminate 4 are selected of a second type, and are selected at a higher strength and stiffness than the fibers of the first type that are applied in the fiber reinforced plastic layers 6', 7' and 6", 7". These fibers of the second type are selected from the group comprising aramid fibers, PBO fibers, carbon fibers.

Further the fibers of the second type are arranged in a first group in the fiber reinforced plastic layer 6 at or near the symmetry plane of the laminate 4, and in a second group in the adjacent fiber reinforced plastic layer 7 at or near the symmetry plane of the laminate 4, whereby the fibers of the second type in the first group and the fibers of the second type in the second group are oriented at a predefined angle with respect to the longitudinal direction of the laminate 4 which is selected in the range plus or minus 10-40 degrees. FIG. 3 shows that in this particular case the predefined angle is selected at a value of plus and minus 40°.

Generally speaking the angle between the fibers of the second type in the first group and the fibers of the second type in the second group is selected at a value depending on the difference in stiffness of the fibers of the first type and the fibers of the second type.

As mentioned herinabove in general the fibers of the first type that are applied externally from the symmetry plane of the laminate 4, have an orientation that corresponds with the longitudinal direction of the aircraft wing. These high stiffness fibers maintain the tensile stiffness that is required to withstand the loads on the aircraft wing according to arrow 2 as shown in FIG. 2. The fibers of the second type of the fiber reinforced plastic layer 7, and the fibers of the second type of the adjacent fiber reinforced plastic layer 6 in the symmetry plane of the laminate that are placed at a predefined angle with respect to the longitudinal direction of the wing 1, provide the laminate 4 and the aircraft wing 1 with significant shear stiffness and strength to withstand torsional loads according to arrow 3 in FIG. 2. Simultaneously the bending stiffness in the wingspan direction is not compromised.

It is further remarked that the potentially low strain to failure of the fibers is compensated in bending direction by their angled orientation; the fibers are not only stretched in their principal direction, but they can also shear as shown by comparison of the right-hand part with the left hand part of FIG. 3. This effectively increases the strain to failure of the plies forming part of the fiber metal laminate of the invention.

The invention claimed is:

1. A fiber metal laminate for an aircraft wing comprising
   (a) a longitudinal direction,
   (b) said laminate further comprising metal layers and fiber reinforced plastic layers in between said metal layers, wherein the metal layers and the fiber reinforced plastic layers are bonded together, and
   (c) wherein said laminate exhibits fibers of a first type and fibers of a second type,
      wherein the fibers of the first type being arranged in said longitudinal direction of the laminate in at least one fiber reinforced plastic layers thereof, and that said laminate comprises adjacent fiber reinforced plastic layers at or near a symmetry-plane of the laminate that are provided with the fibers of the second type, and
      wherein the fibers of the second type are arranged in a first group of fibers in a first layer of the adjacent fiber reinforced plastic layers at or near a symmetry plane of the laminate, and in a second group of fibers in a second layer of the adjacent fiber reinforced plastic layers at or near a symmetry plane of the laminate,
   (d) whereby the fibers of the first group are oriented at a predefined angle in a range of +10 to +40 degrees with respect to the longitudinal direction of the laminate, and
   (e) the fibers of the second group are oriented at a predefined angle in a range of −10 to −40 degrees with respect to the longitudinal direction of the laminate
   (f) and wherein the fibers of the second type have higher strength and stiffness than the fibers of the first type.

2. The fiber metal laminate according to claim 1, wherein an angle between the fibers of the first group and the fibers of the second group is selected at a value depending on the difference in stiffness of the fibers of the first type and the fibers of the second type.

3. The fiber metal laminate according to claim 1, wherein the predefined angle is selected at a value of plus or minus 10 degrees.

4. The fiber metal laminate according to claim 1, wherein the predefined angle is selected at a value of plus or minus 40 degrees.

5. The fiber metal laminate according to claim 1, wherein the metal layers are aluminum layers, that the fibers of the first type in the fiber reinforced plastic layers are at least one selected from the group consisting of glass fibers, aramid fibers, and PBO fibers, and wherein the fibers of the second type in the fiber reinforced plastic layers are at least one selected from the group consisting of aramid fibers, PBO fibers, and carbon fibers.

6. The fiber metal laminate according to any claim 1, wherein the metal layers are aluminum layers comprising alloys from the 5xxx series and/or alloys from the 2xxx series, optionally containing at least 0.1 wt. % lithium.

7. An aircraft wing having
   (a) an upper wing skin panel and a lower wing skin panel,
   (b) wherein at least the lower wing skin panel comprises a fiber metal laminate with one or more metal layers and adjacent fiber reinforced plastic layers in between said metal layers, wherein the metal layers and the fiber reinforced plastic layers are bonded together,
   (c) wherein said laminate exhibits fibers of a first type and fibers of a second type,
      wherein the fibers of the first type are provided in a longitudinal direction of said wing in at least one fiber reinforced plastic layers thereof, and
      the fibers of the second type are provided in adjacent fiber reinforced plastic layers at or near a symmetry plane of the laminate, and wherein the fibers of the second type are arranged in a first group of fibers in a first layer of the adjacent fiber reinforced plastic layers in the symmetry plane of the laminate, and in a second group of fibers in a second layer of the adjacent fiber reinforced plastic layers in the symmetry plane of the laminate,
   (d) whereby the fibers of the first group are oriented at a predefined angle with respect to a longitudinal direction of said wing in a range of +10 to +40 degrees, and
   (e) whereby the fibers of the second group are oriented at a predefined angle with respect to a longitudinal direction of said wing in a range of −10 to −40 degrees, and
   (f) wherein the fibers of the second type have higher strength and stiffness than the fibers of the first type.

8. An aircraft wing according to claim 7, wherein an angle between the fibers of the first group and the fibers of the second group is selected at a value depending on the difference in stiffness of the fibers of the first type and the fibers of the second type.

9. An aircraft wing according to claim 7, wherein the predefined angle is selected at a value of plus or minus 10 degrees.

10. An aircraft wing according to claim 7, wherein the predefined angle is selected at a value of plus or minus 40 degrees.

11. An aircraft wing according to claim 7, wherein the metal layers are aluminum layers, and wherein the fibers of the first type in the fiber reinforced plastic layers are selected from the group consisting of glass fibers, aramid fibers, and PBO fibers, and wherein the fibers of the second type in the fiber reinforced plastic layers are selected from the group consisting of aramid fibers, PBO fibers, and carbon fibers.

12. An aircraft wing according to claim 7, wherein the metal layers are aluminum layers comprising alloys from the 5xxx series and/or alloys from the 2xxx series, optionally containing at least 0.1 wt. % lithium.

13. The fiber metal laminate according to claim 1, wherein the absolute values of the predefined angles of the first and second groups are about the same.

14. An aircraft wing according to claim 7, wherein the absolute values of the predefined angles of the first and second groups are about the same.

* * * * *